United States Patent
Lu et al.

(10) Patent No.: US 12,417,545 B2
(45) Date of Patent: Sep. 16, 2025

(54) METHOD FOR MEASURING HUMIDITY AND ELECTRONIC DEVICE USING SAME

(71) Applicant: Nanning FuLian FuGui Precision Industrial Co., Ltd., Nanning (CN)

(72) Inventors: Ju-Lan Lu, Nanning (CN); Jing-Cheng Tang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 314 days.

(21) Appl. No.: 18/143,542

(22) Filed: May 4, 2023

(65) Prior Publication Data

US 2023/0274446 A1    Aug. 31, 2023

Related U.S. Application Data

(63) Continuation-in-part of application No. 17/898,954, filed on Aug. 30, 2022, now Pat. No. 11,682,123.
(Continued)

(30) Foreign Application Priority Data

Nov. 25, 2020  (CN) ............... 202011340906.X

(51) Int. Cl.
*G06K 9/00*     (2022.01)
*G06T 7/11*     (2017.01)
(Continued)

(52) U.S. Cl.
CPC .......... *G06T 7/246* (2017.01); *G06T 7/11* (2017.01); *G06T 7/70* (2017.01); *G06V 10/40* (2022.01); *G06T 2207/20021* (2013.01)

(58) Field of Classification Search
CPC .................................. G06V 10/40
See application file for complete search history.

(56) References Cited

U.S. PATENT DOCUMENTS

| | | | | |
|---|---|---|---|---|
| 6,208,963 B1 * | 3/2001 | Martinez | ............... | G06F 18/241 |
| | | | | 704/E15.017 |
| 11,488,314 B2 * | 11/2022 | Lu | ............... | G06T 7/246 |

(Continued)

FOREIGN PATENT DOCUMENTS

| | | |
|---|---|---|
| CN | 1191604 A | 8/1998 |
| CN | 204287059 U | 4/2015 |

(Continued)

OTHER PUBLICATIONS

Name of the author:Zhao-jun Xu,Jian-wen Ding,Hou-li Wang,Tao Ding;Title of the article:Study on moisture content fluxion in the course of wood drying above fibre saturation point according to the optical flow;Title of the item: Woodworking Machinery, Issue 5;Date: Oct. 30, 2010.

*Primary Examiner* — Hadi Akhavannik
(74) *Attorney, Agent, or Firm* — ScienBiziP, P.C.

(57) ABSTRACT

A method for measuring humidity at long range using simplified equipment includes creating a formula according to a relationship between multiple sets of known optical flow feature vectors and a known humidity. First and second images are obtained, wherein the first image and the second image are captured as being in the same range of capture. A plurality of feature points in the first image is obtained and an optical flow feature vector for each of the feature points according to apparent changes in position of each feature point according to the second image are calculated. The degree of current humidity according to the optical flow feature vectors and the formula is thus obtained.

6 Claims, 3 Drawing Sheets

Related U.S. Application Data which is a continuation of application No. 17/186,891, filed on Feb. 26, 2021, now Pat. No. 11,488,314.

(51) Int. Cl.
  *G06T 7/246* (2017.01)
  *G06T 7/70* (2017.01)
  *G06V 10/40* (2022.01)

(56) References Cited

U.S. PATENT DOCUMENTS

| | | | |
|---|---|---|---|
| 2014/0116162 A1 | 5/2014 | Christian et al. | |
| 2014/0378170 A1* | 12/2014 | Rudow | G01S 19/43 |
| | | | 455/456.6 |
| 2019/0197710 A1* | 6/2019 | Wang | G06T 7/40 |
| 2019/0340862 A1* | 11/2019 | Liu | G07D 7/12 |
| 2020/0143180 A1* | 5/2020 | Burzo | G06N 20/00 |
| 2020/0183411 A1* | 6/2020 | Oba | B60W 60/0057 |

FOREIGN PATENT DOCUMENTS

| | | |
|---|---|---|
| CN | 107036968 B | 9/2019 |
| KR | 20130097293 A | 9/2013 |
| TW | 201014347 A | 4/2010 |

* cited by examiner

METHOD FOR MEASURING HUMIDITY AND ELECTRONIC DEVICE USING SAME

FIELD

A method for measuring humidity in metrology.

BACKGROUND

Infrared sensing, taken remotely, is widely used in detecting humidity in a wide range of environments. Infrared bands of different thermal states are identified, to study the characteristics of the earth's materials to obtain the earth's surface temperature, for fire monitoring, drought monitoring, etc. However, because such sensors have high requirements for the use environment and acquisition conditions, they are not suitable for daily life. Therefore, a simple way for measuring humidity is needed.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
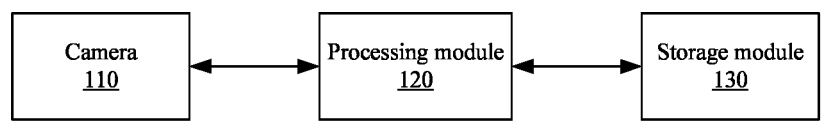
FIG. 1 is a block diagram of an electronic device in accordance with an embodiment.

FIG. 1 is a block diagram of an electronic device (electronic device 100) in accordance with an embodiment. The electronic device 100 at least includes a camera 110, a processing module 120, and a storage module 130. The camera 110 can be any device capable of capturing images, and is used to capture at least two images at the same range at a predetermined time. The processing module 120 connects to the camera 110, preprocesses images received from the camera 110, obtains multiple feature points in the processed images, tracks optical flow change of each feature point, and calculates degree of humidity based on the optical flow feature vectors of the feature points and formula. The processing module 220 can be, for example, dedicated hardware circuits or general-purpose hardware (e.g., a single processor, a multi-processor with parallel processing capabilities, a graphics processor, or other computing capabilities processor), and is able to provide the functions described below. The storage module 130 connects to the processing module 120, and can be a non-volatile storage device such as a hard disk, a flash drive, etc., and is used to store the algorithms and formulas for the foregoing process. Moreover, the formulas can be created in advance by the processing module 120. For example, the user can take multiple sets of at least two images with the same range of capture in an environment with different degrees of humidity, and create the formulas according to the relationship between the changes in the optical flow feature vectors of multiple feature points in at least two images and the known humidity. In this way, the processing module 120 may obtain the optical flow feature vectors of the multiple feature points of two continuous images in any environment, and calculate the degree of humidity based on the optical flow feature vector and the formulas. In addition, the electronic device 100 may further include a display module not shown in FIG. 1, which may be a display panel (such as a thin-film liquid crystal display panel, an organic light-emitting diode panel, or other panels with display capabilities) for displaying the results of calculation. Moreover, when the electronic device 100 is an augmented reality device, the degree of humidity can also be projected into the display scene. It should be noted that the foregoing descriptions about the camera 110, the processing module 120, and the storage module 130 are only examples, the disclosure not being limited thereto.

According to an embodiment, after the processing module 120 obtains at least two continuous images (i.e., the first image and the second image) with the same range of capture from the camera 110, each image is preprocessed, and feature points in the images are obtained. For example, the processing module 120 first performs gray-scale processing on the first image to convert it into a first gray-scale image, divides the first gray-scale image into multiple grids, and sets intersection points of each of the two grids as feature points. The user may averagely divide the image into multiple grids with the same size of area, or, when objects in the images (such as a large-scale landscape) may be distorted due to the use of a wide-angle lens, the processing module 120 may cut the image into multiple grids according to longitude and latitude, and then take the intersection points of each of the two grids as the feature points. To improve the calculation accuracy, user may adjust the number of grids according to the need. For example, the great number of the grids, the higher of the accuracy, as the number of feature points is increased.

After obtaining the feature points of the first image, similarly, the processing module 120 obtains a second gray-scale image corresponding to the second image, and searches among the pixels in the second gray-scale image for those with the same gray-scale value. Such search is within a predetermined range of coordinates corresponding to each feature point in the first gray-scale image, and the coordinates corresponding to the pixels as the coordinates of the feature point after displacement are used. Next, the processing module 120 calculates the change in coordinate of each feature point to obtain the optical flow feature vector, dividing the two-dimensional coordinate system into multiple sectors with the same size of area. The optical flow feature vectors of all feature points located in the same sector are added to obtain the total feature vector corresponding to each sector. Finally, the processing module 120 obtains the humidity corresponding to the first image and the second image according to the total of the feature vectors in the multiple sectors and by applying the formula.

According to another embodiment, when the user uses the electronic device 100 to obtain the first image and the second image, errors may occur due to hand shaking or trembling. Therefore, the processing module 120 may set a threshold for physical jitter in advance based on multiple sets of images. Thus when the optical flow feature vector of the feature points is less than the jitter threshold, it is determined as representing error, and the processing module 120 will not consider the optical flow feature vectors corresponding to the feature points, to avoid affecting the accuracy.

In addition, the processing module 120 may capture more than two continuous images to improve the accuracy of the calculated humidity. For example, the processing module 120 may capture four continuous images, and divide the four continuous images into 12 space-time units. Next, if the processing module 120 can divide the two-dimensional coordinate system into 8 sectors, thus the processing module 120 may obtain a feature vector of 96 dimensions (12*8). Finally, the processing module 120 calculates the current degree of humidity according to the total feature vector corresponding to each dimension and the formula.

Figure 2:
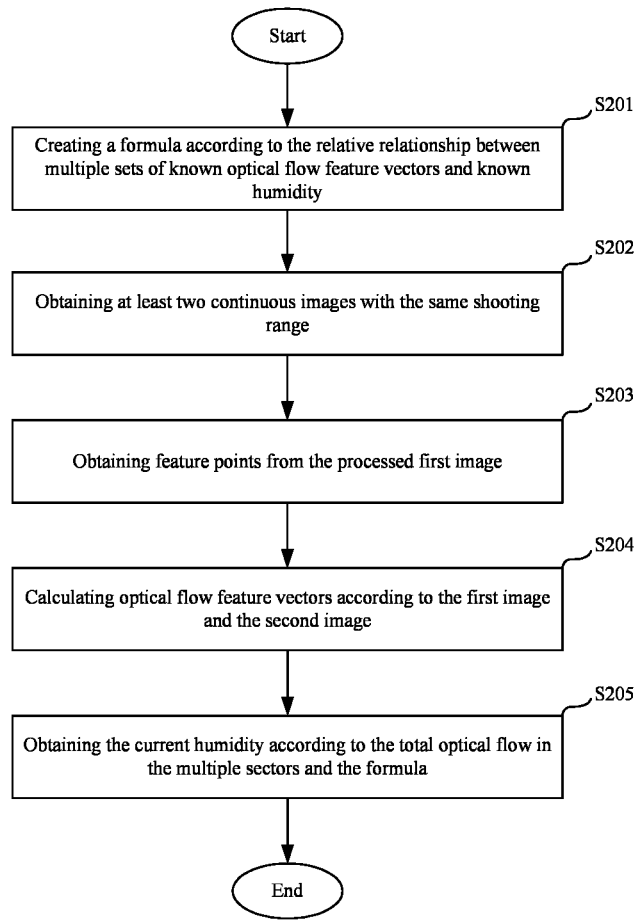
FIG. 2 is a flowchart of a method for measuring humidity in accordance with an embodiment.

FIG. 2 is a flowchart of a method for measuring humidity in accordance with an embodiment.

At step S201, the processing module 120 creates a formula according to the relationship between multiple sets of known optical flow feature vectors and known humidity, and stores the formula in the storage module 130.

At step S202, the camera 110 obtains at least two continuous images with the same range of capture.

At step S203, the processing module 120 preprocesses the first image, divides the processed first image into multiple grids, and takes the intersection of every two grids as the feature points.

At step S204, the processing module 120 preprocesses the second image, searches for pixels with the same gray-scale value in the second gray-scale image according to the coordinate corresponding to each feature point in the first gray-scale image, and calculates the optical flow feature vectors according to the coordinates of each feature point after determining the displacement.

At step S205, the processing module 120 divides the two-dimensional coordinate system into a plurality of sectors with the same size of area, adds up the optical flow feature vectors of all the feature points in each sector, and obtains the current degree of humidity according to the total of optical flows in the multiple sectors and the formula.

Figure 3:
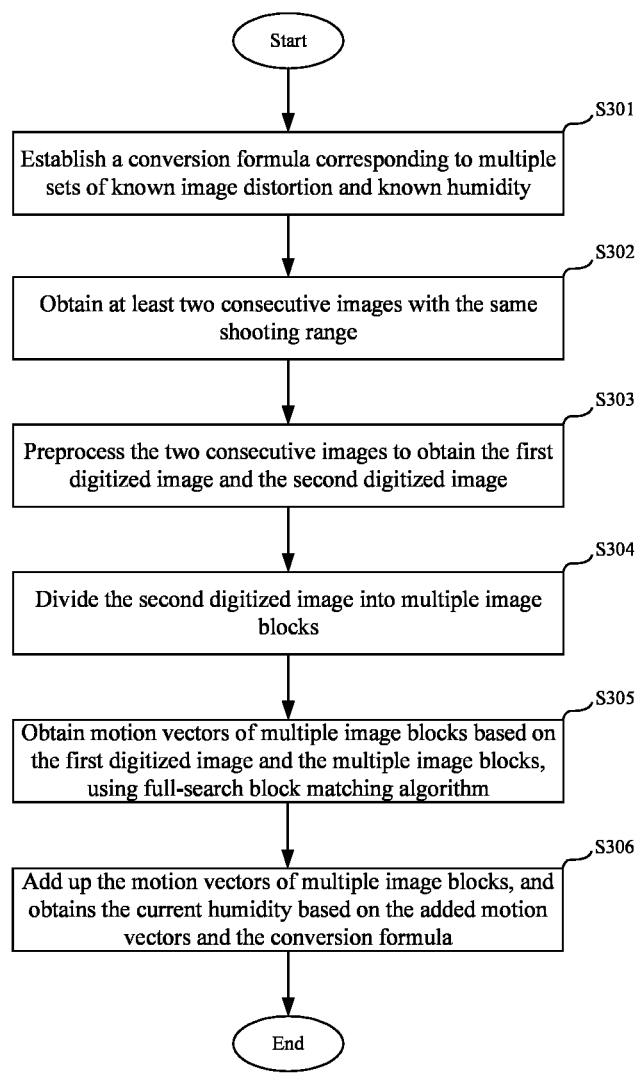
FIG. 3 is a flowchart of a method for measuring humidity in accordance with another embodiment.

FIG. 3 is a flowchart of a method for measuring humidity based on another embodiment.

At step S301, the processing module 120 establishes a conversion formula corresponding to multiple sets of known image distortion and known humidity, and stores it in the storage module 130. In this embodiment, the conversion formula is established using motion vectors as image distortion.

Specifically, the conversion formula can be calculated in advance by the processing module 120. For example, a user can take at least two images with the same shooting range in environments with different humidities, and calculate the conversion formula based on the relative relationship between the distortion of multiple image blocks in at least two images (i.e., image distortion) and the known humidity using least squares method. Therefore, after the processing module 120 obtains the motion vectors of multiple image blocks in two consecutive images in any environment, it can calculate the current humidity based on the motion vectors and the conversion formula.

At step S302, the camera 110 obtains at least two consecutive images with the same shooting range, namely, the first image and the second image.

Specifically, the first image is the previous frame, and the second image is the current frame.

At step S303, the processing module 120 preprocesses the first image and the second image to obtain a first digitized image and a second digitized image.

The processing module 120 performs sampling and quantization on the first and second images, respectively, obtains discrete pixels with discretized spatial position coordinates, converts pixel gray values into discrete integer values through quantization, and finally encodes them to obtain the first and second digitized images.

At step S304, the processing module 120 divides the second digitized image into multiple image blocks.

For example, the processing module 120 divides the second digitized image into M×N image blocks without overlap between blocks.

At step S305, the processing module 120 obtains motion vectors of multiple image blocks based on the first digitized image and the multiple image blocks, using full-search block matching algorithm.

For example, the processing module 120 uses block matching to find the best-matching block A' in the first digitized image for each image block A of the second digitized image, and records the motion vector of image block A as the motion vector of the image block A' moved to the image block A.

During the block matching process, assuming that the maximum displacement of any image block in the X and Y directions is Xmax and Ymax, respectively, the full-search block matching algorithm searches for the best-matching block A' within the range of (M+2Xmax, N+2Ymax) centered at the image block A.

At step S306, the processing module 120 adds up the motion vectors of multiple image blocks, and obtains the current humidity based on the added motion vectors and the conversion formula.

Although the method as described above has been described through a series of steps or blocks of a flowchart, the process is not limited to an order of the steps, and some steps may be in a different order or done at different times. In addition, those skilled in the art should understand that the steps shown in the flowchart are not exclusive, other steps may be included, or one or more steps may be deleted without departing from the scope of the claims.

In summary, according to the embodiments, by calculating the optical flow feature vectors of single feature points in two continuous images and the conversion formula calculated in advance, the humidity in the current environment can be calculated by simple equipment. Moreover, by increasing the number of feature points or the number of continuous images, the level of humidity can be calculated more accurately.

According to another embodiment of the present invention, the humidity in the current environment can be calculated based on the motion vectors calculated from two consecutive images, and the conversion formula established in advance using the motion vectors as image distortion to represent humidity.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for measuring humidity, the method comprising:
   establishing a conversion formula corresponding to multiple set of know image distortion and know humidity;
   obtaining at least two consecutive images with the same shooting range;
   preprocessing the two consecutive images to obtain a first digitized image and a second digitized image;
   dividing the second digitized image into a plurality of image blocks, wherein the plurality of image blocks are M×N image blocks, the M×N image blocks are spaced from each other;
   obtaining a plurality of motion vectors of the plurality of image blocks based on the first digitized image and the plurality of image blocks, using full-search block matching algorithm, wherein the full-search block matching algorithm comprises searching for a best-matching image block A' in the first digitized image within a range of (M+2Xmax, N+2Ymax) centered at an image block A of the second digitized image, wherein Xmax and Ymax are maximum displacements of any image blocks in the X and Y directions, respectively;

adding up the plurality of motion vectors of the plurality of image blocks; and obtaining a current humidity based on the added motion vectors and the conversion formula.

2. The method as claimed in claim 1, wherein the conversion formula is established using motion vectors as image distortion.

3. The method as claimed in claim 1, wherein the conversion formula is established in advance using an at least square method based on a relative relationship between the distortion of image blocks in at least two images with different known humidities and the known humidities.

4. An electronic device comprising:
a camera, adapt for obtaining at least two consecutive images with the same shooting range;
a processing module adapt for establishing a conversion formula corresponding to multiple set of know image distortion and know humidity, preprocessing the two consecutive images to obtain a first digitized image and a second digitized image, dividing the second digitized image into a plurality of image blocks, wherein the plurality of image blocks are M×N image blocks, the M×N image blocks are spaced from each other, obtaining a plurality of motion vectors of the plurality of image blocks based on the first digitized image and the plurality of image blocks, using full-search block matching algorithm, wherein the full-search block matching algorithm comprises searching for a best-matching image block A' in the first digitized image within a range of (M+2Xmax, N+2Ymax) centered at an image block A of the second digitized image, wherein Xmax and Ymax are maximum displacements of any image blocks in the X and Y directions, respectively, adding up the plurality of motion vectors of the plurality of image blocks, and obtaining a current humidity based on the added motion vectors and the conversion formula; and
a storage module adapt for storing the conversion formula.

5. The electronic device as claimed in claim 4, wherein the conversion formula is established using motion vectors as image distortion.

6. The electronic device as claimed in claim 4, wherein the conversion formula is established in advance using an at least square method based on a relative relationship between the distortion of image blocks in at least two images with different known humidities and the known humidities.

* * * * *